United States Patent [19]

Adachi

[11] 4,440,453
[45] Apr. 3, 1984

[54] HYDRAULIC SYSTEM FOR A VEHICLE

[75] Inventor: Yoshiharu Adachi, Gamagori, Japan

[73] Assignee: Aisin Seiki Kabushiki Kaisha, Kariya, Japan

[21] Appl. No.: 361,375

[22] Filed: Mar. 24, 1982

[30] Foreign Application Priority Data

Mar. 31, 1981 [JP] Japan .................................. 56-49011

[51] Int. Cl.³ .............................................. B60T 13/16
[52] U.S. Cl. ...................................... 303/50; 60/404; 137/101
[58] Field of Search ............. 60/404; 137/101, 115, 137/116; 303/10, 11, 50, 57, 59, 60, 63

[56] References Cited

U.S. PATENT DOCUMENTS 3,841,095 10/1974 Baker .
4,181,371 1/1980 Adachi .................................. 303/50
4,313,454 2/1982 Jensen .................................. 137/101

*Primary Examiner*—Duane A. Reger
*Attorney, Agent, or Firm*—Oblon, Fisher, Spivak, McClelland & Maier

[57] ABSTRACT

A hydraulic system for a vehicle having a open-center hydraulic brake booster powered by an engine-driven single rotary pump with an unloader valve into which is incorporated a bypass valve to enable a fluid flow to bypass the unloader valve into the brake booster. The invention contemplates the use of the bypass valve for such purpose as pressurizing the fluid circuit upstream of the bypass valve for storaging fluid in a fluid storage member under pressure in case of rest position of the booster for actuating the booster when the pump failed.

6 Claims, 3 Drawing Figures

1

HYDRAULIC SYSTEM FOR A VEHICLE

BACKGROUND OF THE INVENTION

1. Field of the Invention

This invention relates to a hydraulic system for a vehicle having a conventional open-center power brake booster powered by means of an engine-driven rotary pump with a valve that enables a small portion of the fluid delivered by the pump to be supplied to the booster while another remaining portion to be stored in an accumulator between predetermined pressure limits and in addition to supply to an open-center hydraulic actuator, such as, for example, an open-center power steering system.

2. Prior Art

These systems as they are known conventionally in the art, momentarily ceases fluid flow to the booster, as usual, when the accumulator is charged causing the driver's foot on the brake pedal to be confused in feeling a reactional brake force due to such cessation of fluid flow to the booster.

SUMMARY OF THE INVENTION

A principal object of the invention is to provide an improved hydraulic system for use in vehicles freed from the confusion in feeling the braking reactional force through a brake pedal positioned for actuation by the driver.

It is another object of the present invention to provide a hydraulic system including a power brake booster of open-center type and an unloader valve with a bypass valve for restricting fluid flow passing through the unloader valve in order to provide an increase in pressure of the fluid flow when the booster is in rest position. The increase in pressure provides an adequate pressure to be charged in the accumulator for fear of failure of fluid flow to the brake booster through the unloader valve.

The foregoing and other objects, features and advantages of the invention will be apparent from the following more particular description of preferred embodiments of the invention as illustrated in the accompanying drawings.

DETAILED DESCRIPTION OF THE PREFERRED EMBODIMENTS

Figure 1:
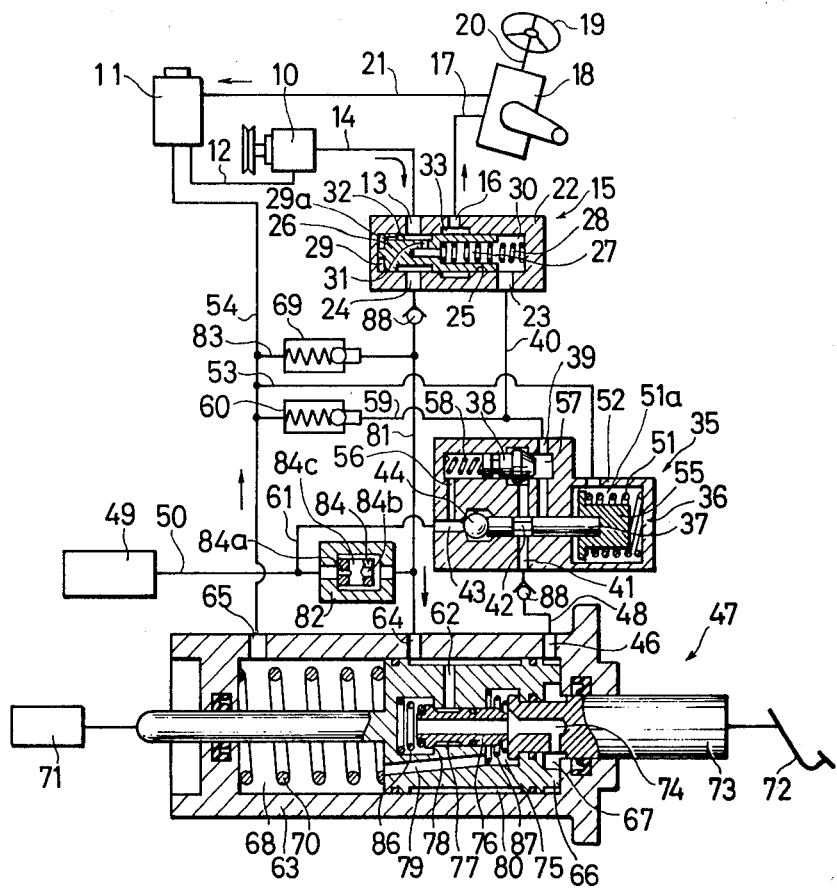
FIG. 1 shows a hydraulic system according to the present invention with parts in somewhat schematic longitudinal cross sections.

Referring now to the drawing, 10 designates a rotary vane pump which would preferably be driven by a belt from the engine crank shaft and which may be connected by a line 12 with a reservoir providing a supply of fluid. The discharge of this pump is conducted by a conduit 14 to a pump inlet port 13 of a flow divider valve 15. A power steering port 16 is connected by a conduit 17 to the inlet port of the open-center valve portion of the power steering gear 18, which is of conventional construction and will not be described in detail. The steering gear is shown with a steering column 20 and steering wheel 19 by means of which the driver controls the vehicle. The output port of the steering valve is connected back to the reservoir through a common return line, which is designated by the numeral 21.

The flow divider valve generally indicated by the numeral 15 is of conventional construction which may be of the type shown in Yoshiharu Adachi U.S. Pat. No. 4,154,257 assigned to the common assignee of this application. The flow divider valve 15 has a hollow casing 22 having the pump port 13 and the steering port 16. The body or casing 22 has at the lower right an outlet port 23 for delivering a controlled fluid flow and at the lower left an outlet 24 for delivering the major remainder of the pump flow entered into the body through the pump inlet 13. The pump port 13 is shown as forming the mouth of a valve bore 25 which contains, in close slidable relationship, a valve plunger 26 of generally cylinder-shape having an internally opened recess 27. The recess 27 receives one end of a calibrated control spring 28, the other end of which is seated in a bottom wall of the body 22. The opposite end bottom wall of the body 22 cooperates with a bottom wall of the plunger 26 to define a chamber 29 having an orifice 29a passing through the latter. The other bottom wall of the body 22 cooperates with the recess 27 to define another chamber 30. The annular portion of the plunger 26 has another orifice 31 which communicates the recess 27 with an annular groove 32 in the external face of the plunger 26. One endge of the annular groove 32 serves to form resticting valve in cooperation with the annular groove 33 which communicates with the steering port 16.

The orifice 31 is so sized that fluid flow therethrough will create a pressure drop such that the pressure in the chamber 29 exceeds the pressure in the spring-containing cavity 30 sufficiently to exert a force on the area of plunger 26 which exceeds the installed load of the spring 28 and the plunger 26 will therefore move to the right. When pump 10 is in action, the plunger 26 moves to the right against calibrated spring 28 to a position slightly apart from that shown in dependency upon a pressure drop created across the orifice 31. In this position, a more or less closely regulated small flow will continue through the pump port 13, annular groove 32, orifice 31, recess 27, chamber 30, and output port 23, permitting the major remainder of the pump flow to continue through the pump port 13 and annular groove 32 to ports 16 and 24.

At the middle portion of FIG. 1 is shown an unloader valve generally designated by the numeral 35 having a body 36 in which are a plunger 37 and a valve 38 as hereinbelow detailed. The plunger 37 is contained in a close slidable fitting relationship, in a corresponding bore of the body 36. The body has an inlet port 39 communicated through a conduit 40 with the output port 23 of the flow divider 15. The inlet port 39 extends internally of the body 36 to intersect a middle portion of the plunger 37 as shown. The body further has an outlet port 41 which extends internally of the body 36 and intersects the plunger 37 at an annular groove 42 of the plunger 37 in the position shown.

The port 41 further extends internally to intersect the valve 38 as shown which governs communication between the ports 39 and 41 as detailed below. A ball 44 is captive in a corresponding cavity in freely movable relationship to cooperate with a port 43 and the corresponding bore in which the plunger 37 slides, diametrically larger than the port 43, causing a known hunting preventing effect in response to fluid pressures. It should be noted that the port 43 and the bore are in line with each other. The port 41 is in communication with an inlet port 46 of a hydraulic brake booster 47 through a conduit 48. The other port 43 is in communication with an accumlator 49 through a conduits 61 and 50. Plunger 37 is spring-urged normally by a returning spring 51 captive in a corresponding cavity 51a of the body 36 which is in communication through a conduit 53 with a common drain conduit 54 to be described further. The spring 51 is retained between a bottom wall of the cavity 51a and a retainer 55 engaging the plunger as shown. The valve 38 is in close slidable fit relationship in a corresponding bore which is in communication with the port 43 through drilled passage 56 and normally spring biased by a spring 58 toward a bore 57 intersecting the port 39, thus blocking communication between the ports 39 and 41. The inlet port 39 of the unloader valve 37 is in communication with the common drain conduit 54 through a conduit 59 and across a relief valve 60 on the conduit 59.

Referring now to the booster 47, in the bottom of FIG. 1, a body or casing 63 is provided with another inlet port 64 in addition to the inlet port 46. The body 63 has an outlet or drain port 65 which is in communication through the common drain conduit 54 with the reservoir 11. Within the body 63 is a power piston 66 of cylindrical shape in close fit and slidable relationship therewith which divides the interior of the body 63 into a pressure chamber 67 and a drain chamber 68. The pressure chamber 67 is normally in communication with the port 46 while the drain chamber 68 is in communication with the port 65. A large restoring spring 70 is retained between the power piston 66 and the left bottom wall of the body 63 and normally spring urges the power piston 66 toward abutment against the right bottom wall of the body 63. The power piston 66 extends to the left outwardly of the body 63 through the left bottom wall in slidable and sealed relationship, so that the left extremity engages the known brake master cylinder diagrammatically shown in the view by the numeral 71. The brake booster 47 is arranged, as shown in the bottom right in FIG. 1, to be actuated by means of a pedal 72 and push rod 73 positioned for actuation by the driver, in the usual manner.

The power piston is of a cylindrical form in which is contained the left end portion of the push rod 73 (or reaction member) in close fit and slidable relationship. A right angled passage 74 is so formed in the end portion of the push rod 73 that the pressure chamber 67 and a chamber 75 of the power piston 66 are communicated with each other. A sleeve 76 is, in close fit and slidable relationship, in a corresponding bore in the power piston 66. The sleeve 76 is formed with an annular groove 77 in the external face and conical valve faces at its both ends to serve as a valve member to be described later. The right extremity conical valve face cooperates with an entrance of the right-angled passage 74 to form a valve mechanism while the left end conical face cooperates with an annular shoulder 78 in the internal face of the power piston 66. An inclined drilled passage 79 normally communicates the chamber 75 with the draine chamber 68. In the external face of the power piston 66 is formed a wide annular groove 80 communicating with the port 64 and also with the annular groove 77 of the sleeve 76 through a drilled passage 62. The port 64 is communicated via a conduit 81 with port 24 of the flow divider valve 15. The conduit 81 is in communication with the accumulator 49 across an orifice means 82 on a conduit 50. Within the orifice means is slidable a double acting orifice member 84 having a pair of holes 84a and 84b of different diameter, so that the small diameter hole 84a acts when the accumulator 49 is charged while the large diameter hole 84b and an outer annular leakage clearance of the orifice member 84 together act when the accumulator falls in pressure. For such operation, the orifice member 84 has a central cavity 84c to form a pair of end walls on the both side of the cavity in which are formed respectively the holes 84a and 84b. In case of charging the accumulator 49, the left end wall abuts the left internal face of the bore of the body of the orifice means 82, so that the left small diameter hole 84a is active. In case of fall in pressure of the accumulator 49, the orifice member 84 slides to abut against the right internal face of the bore so that fluid flows, bypassing the left orifice 84a, through the leakage clearance outside of the member 84 and the central cavity 84c to the large hole 84b. This is effective for the fluid flow to promptly power the booster 47 when the pump flow failed, as will be further described later in greater detail.

A compressed spring 86 is retained between the left end of the sleeve or valve member 76 and the left bottom wall of the cylindrical power piston 66, normally urging the member 76 to the shoulder 78 of the power piston. The other spring 87 is retained between the end of the push rod or reaction member 73 and the bottom wall of the chamber 75 to thereby ensure in the rest position the opened position of the booster and opened position of the right end conical valve face of the valve member or sleeve 76 as shown. The numerals 88 designate one way check valves of conventional construction. The conduit 81 is connected to the common drain conduit 54 through conduit 83 having a relief valve 69.

Operation

When the system is in rest position, assuming the accumulator 49 has not yet been charged, all the parts of the system occupy positions shown in FIG. 1. When the pump 10 commences its action from the rest position shown, the output flow from the pump enters through the conduit 14, port 13 and the orifice 29a into the chamber 29 of the flow divider 15. The orifice 31 should be so sized that a flow therethrough will create a pressure drop such that the pressure on the left hand end or acting face of plunger 26 exceeds that in the spring chamber sufficiently to create a force on the area of the plunger 26 which exceeds the installed load of the spring 28, and the plunger will, therefore, move to the right, permitting communication between ports 13 and 16 by means of the annular recesses 32 and 33. In this case, the remainder of the pump flow continues to the steering gear 18 through the port 16 and conduit 17 and thereafter through conduit 21 back to the reservoir 11. If the power steering system is actuated, causing restriction in the flow, pressure will rise in conduit 17 and also in conduit 14 and the increase in pressure will have a tendency to increase the flow through the orifice 31. This increased flow results in increased pressure drop, which will causes the plunger 26 to move further to the right until it partially covers the drilled passage port 23 and adds sufficient restriction to the flow to maintain the predetermined quantity through the orifice 31. Inferentially there will be a slight increase in flow because of the slight increase in pressure drop required to compensate for the added load of the spring. Thus, it will be seen that regardless of whether the power steering system is used or not, a more or less closely regulated small flow will continue through orifice 31 as previously described.

Fluid flow from the output port 23 of the flow divider 15 passes through the conduit 40 and port 39 and enters the cavity 57. The fluid flow opens the valve 38 against the spring bias of the spring 58 and thence passes on through the port 41, conduit 48, port 46, pressure chamber 67, right-angled passage 74, right end conical valve face of the sleeve 76 in opened position, chamber 75, passage 79, drain chamber 68, outlet port 65, and conduit 54 and finally to the reservoir 11. It should be noted that in the flow, pressure will rise in the portion upstream of the valve 38, comprising cavity 57, conduit 40, flow divider 15, and conduit 14. As the pressure in the above circuit portion increases, it will, in a brief time, equal the pressure in the accumulator 49 through port 24, conduits 81 and 50 and across the orifice means 82, at which time the interrupted flow through the check valve 88 on the conduit 81 will be able to lift the ball of the check valve 88 and pass on to the accumulator 49 through orifice means 82 and conduit 50 urging the orifice member 84 to the left with the small hole 84a in acting position. Thus the accumulator 49 is charged and the restriction by orifice 84a keeps a fluid which is ensured for possible actuation of the booster 47.

At some predetermined high limit of pressure, the force which it exerts on the ball 44 will have increased to the point where it can overcome the load of the spring 51 whereupon the ball 44 will be lifted from its seat portion of port 43, forcing the plunger 37 to the entrance of plunger receiving bore, so that the annular groove 42 of the plunger 37 communicates both ports 39 and 41. It will be noted that after the accumulator 49 is charged at the predetermined high limit or pressure, the pump flow bypasses the valve 38 and passes port 39, annular groove 42 and port 41 without being pressurized until brake booster function is required.

If the brake booster 47 is actuated as described below, the booster is powered by the pump flow passing through port 39, annular groove 42, and port 41. From the foregoing, it will be seen that regardless of whether the accumulator 49 is being charged or not, a more or less closely regulated small flow will continue through the brake booster 47 from the unloader valve 35 and hence from the flow divider 15. This is the contemplation of the present invention as described in the foregoing and effective to elliminate any tendency of interruption of pump flow upon charging the accumulator 49. The disadvantage associated with the conventional system due to the interruption is avoided.

It will be further noted that the diametrical difference between the port 43 and the bore receiving the plunger 37 provides means for preventing the known hunting of the ball 44 of the unloader valve 35 which is so conventional that further description may be abbreviated.

When the pedal 72 is depressed, and push rod 73 is moved to the left, the pump flow passing through the brake booster 47 is restricted in dependency upon decreases of the clearance between the push rod 73 and the sleeve 76, thus causing pressure increase in chamber 67. The power piston 66 is moved as a result to the left and forces the master cylinder 71 in the known manner.

Assuming that the pump is failed and the booster 47 is actuated, both check valves 88 are closed in the absence of pressure in the circuit portion upstream of the check valves. The pressure in the accumulator 49 will power the brake booster 47 as described below.

In the absence of any reactional force to the push rod and hence the pedal 72, the push rod 73 is over-pushed until its left end abuts against the right end of the sleeve 76 and thence moves to the left together with the sleeve so that the interrupted flow through the shoulder 78 will be able to pass on from the accumulator 49 to the power chamber 67 through the fluid circuit comprising conduit 50, orifice means 82, conduit 81, port 64, annular groove 80, passage 62, annular groove 77, cavity containing the spring 86, sleeve 76, and right angled passage 74 to the power chamber 67.

Figure 2:
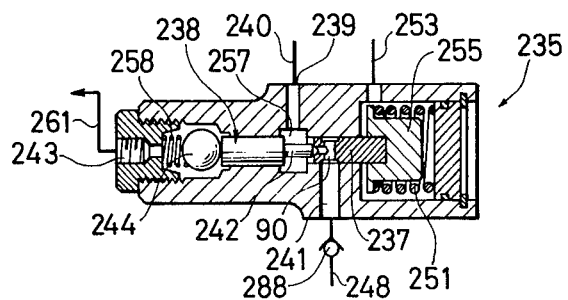
FIG. 2 is a cross sectional view of a modification of a part shown in FIG. 1.

In FIG. 2 is shown a modification of the unloader valve 35 in FIG. 1. For convenience, the same numerals as FIG. 1 in 200 series are used so that duplicated description is considered unnecessary. A plunger form valve 238 has a central projection 242 and the other valve 237 has a drilled passage 90 communicating the inlet 239 and outlet 241. The entrance of the passage 90 cooperates with the central projection 242 in controlling or restricting fluid flow therethrough.

In rest position, every part occupies the position shown. When the pump flow enters into the valve 235 through the port 239, the cavity 257 is pressurized to thereby urge the plunger 238 to the left against the spring bias of the spring 358 and the drilled passage 90 is opened, permitting fluid flow to pass through the drilled passage. The flow is restricted by the small diameter passage 90 and therefore pressure will rise in the circuit upstream of the valve 235, at which time the flow in the circuit will be able to pass on the orifice member 82 (FIG. 1) to the accumulator 49 to charge thereof.

In the operation, a flow is ensured through the drilled passage 90 to the booster 47 (FIG. 1).

Assuming that the accumulator 49 is charged and adequate pressure is in communication with port 243 to act upon the plunger 238, the plunger or valve 238 will have been moved against the caribrated spring 258 so that projection 242 pushes the plunger 237 to the right into a position in which cavity 257 is in communication with the port 241, thus fluid flow being also permitted through the communicated ports 239 and 241 by bypassing the passage 90.

It will be understood that fluid flow through the valve 235 is ensured regardless of whether the accumulator is being charged or not in the similar manner to that described in the foregoing with respect to FIG. 1.

Figure 3:
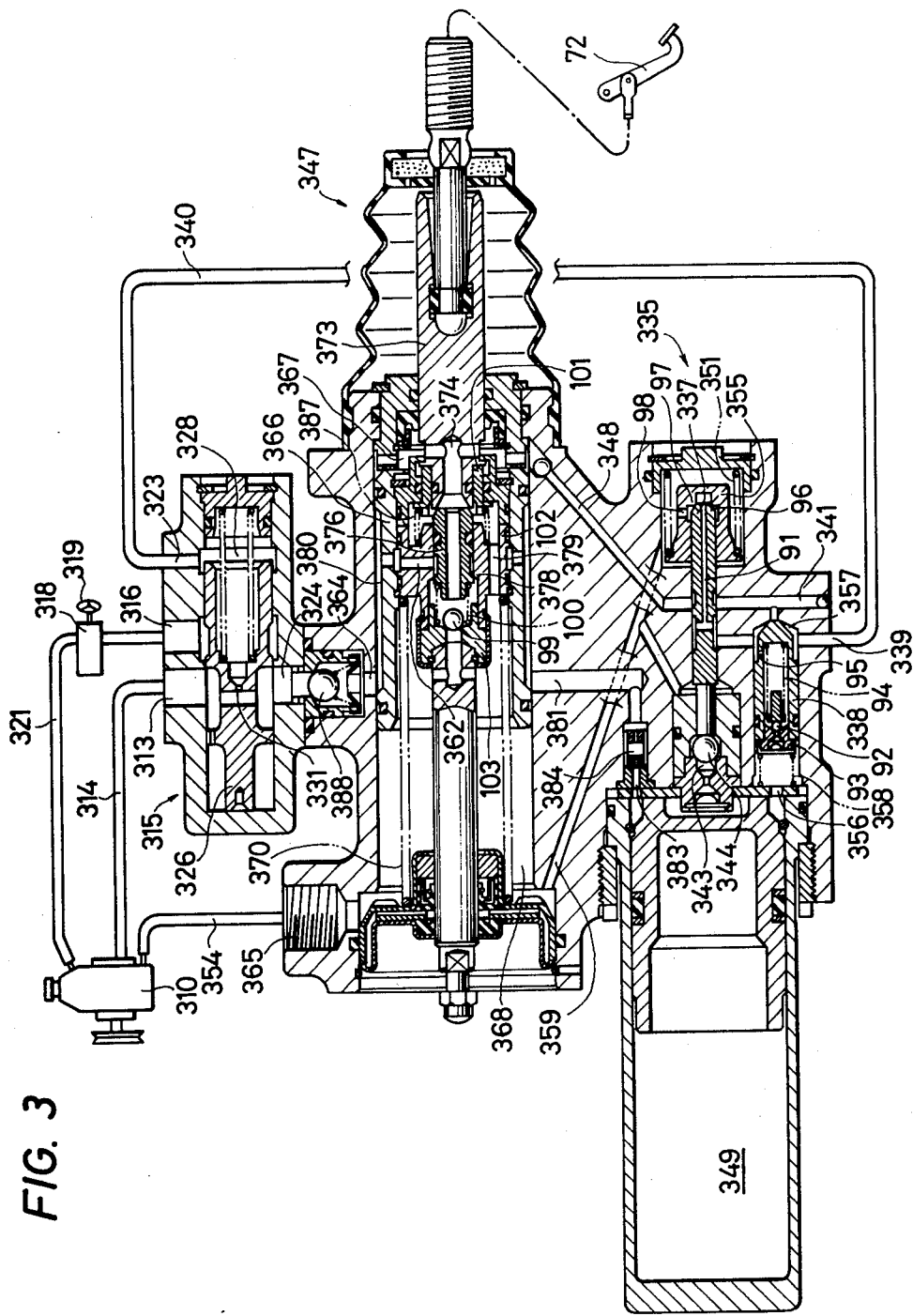
FIG. 3 shows a somewhat schematic longitudinal cross section of another embodiment of the invention.

In FIG. 3 is shown another embodiment of the invention. Parts similar to those in FIG. 1 are designated by the same numerals in 300 series so that duplicated description may be abbreviated.

The bypass valve or pressure regulator valve 338 at the middle bottom of FIG. 3 is of generally cylindrical form within which is contained a relief valve 92 normally urged by a spring 94 to the seat 93. Pressure in the accumulator 349 is in communication with valve 338 to act thereupon. In case of an excess pressure over the predetermined one in the accumulator, the check valve ball 92 is opened. In this case, the fluid flows past the valve 92 and orifice 95 into the cavity 357 and thence through the circuit downstream of the passage port 339 to be readily seen by tracing the illustrated circuit.

Referring to the unloader valve 335, the plunger 337 is provided with an axial passage 91 and a valve face 96 at the right end to which a retainer 355 is spring urged normally by a spring 351. The retainer 355 is formed with a seat 97 to cooperate with the valve face 96 of the plunger 337. An excess pressure in the passages 341, 348 and the brake booster 347 will lift the seat 97 from the valve face 96. In this case, the fluid flows through the passage 91 past the relief valve formed of the valve face 96 and the seat 97 and thence through a passages 98 and 359 to the drain chamber 368. The drain chamber 368 is in communication through the port 365 and common conduit 354 with the reservoir mounted in the pump 310.

The brake booster 347 is provided with a ball valve 99 within a cavity 100 of the power piston 366. The ball valve 99 cooperates with its seat to form a check valve. When pump flow and pressure in the accumulator 349 are both failed and the power piston 366 is manually operated, the ball valve 99 is lifted by a residual fluid in chamber 368 to permit the fluid to flow therethrough into the cavity 100 and hence power chamber 367 so that any tendency of pressure differential is avoided across the power piston. This enables the power piston 366 to be manually moved to the left for braking purpose.

In this case, the input rod 373 forces an annular transmitting member 101 to slide in the first reaction bush 102 and to abut a shoulder portion thereof and thence causes the bush 102 to push a second reaction bush 103 against the spring bias of the spring 387. Since the first and second reaction bushes 102 and 103 are both fast in the power piston 366, such manual actuation force is transmitted to the power piston and hence to the output rod and thence to the brake master cylinder.

It will be seen that the system according to the invention operates to continue pump flow to the brake booster control valve portion regardless of whether the accumulator is being charged or not so that any tendency to affect the driver's feeling to brake reactional force is avoided.

What is claimed is as follows:

1. A hydraulic system for automotive vehicles comprising,
    a flow divider valve means for dividing a fluid flow from a single fluid flow supply source into a regulated portion and a remaining portion,
    a fluid storage means in communication with said single fluid flow supply source for charging a fluid therein,
    an unloader valve means for interrupting fluid flow of said regulated portion passing therethrough in response to fluid pressure in said fluid storage means,
    a hydraulic brake booster having a power piston dividing the interior of said booster into a pressure chamber in communication with said fluid flow from said flow divider and a drain chamber communicating with a reservoir and being provided with open-center valve means for controlling fluid flow from said pressure chamber into said drain chamber upon a manual actuation and a normally closed valve means for permitting communication between said pressure chamber and said fluid storage means upon an extension of said manual actuation subsequently to closure of said open-center valve means, and
    a bypass valve means for permitting a fluid flow of said regulated portion to bypass said unloader valve means in response to fluid pressure in fluid flow of said regulated portion upstream of said unloader valve means and downstream of said flow divider.

2. A hydraulic system as set forth in claim 1 wherein, said bypass valve means is further in communication with said fluid storage means to be acted by fluid pressure in said fluid storage means against fluid pressure in said regulated portion of fluid flow upstream of said unloader valve means and downstream of said flow divider valve means.

3. A hydraulic system as set forth in claim 1 wherein, said bypass valve means and said unloader valve means both are of plunger from slidable in line with each other, said unloader valve means having a passage therein with an entrance of the latter opened in an end face of said unloader valve means adjacent said bypass valve means, said bypass valve means having a central valve face in an end face of the latter facing the said entrance in valving relation with said entrance, said entrance of said passage of said unloader valve means and said central valve face of said bypass valve means being in communication with said regulated portion of fluid flow from said flow divider valve means while an outlet of said passage of said unloader valve means being in communication with said brake booster, said bypass valve means and said unloader valve means being respectively spring-urged toward engagement of said central valve face and said entrance of said passage with each other for closure of said passage.

4. A hydraulic system as set forth in claim 1 wherein, said system has a body and said unloader valve means being of a plunger form slidable in said body, said body being provided with an inlet communicating with said regulated portion of fluid flow from said flow divider and an outlet communicating with said pressure chamber of said brake booster, said unloader valve means being provided with an annular groove in valving relation with said inlet and said outlet and a passage extending from said annular groove to one end face of said unloader valve means to open in said end face, said body being provided with a seat member slidable therein in line with said unloader valve means in valving relation with said end face of said unloader valve means for closure or opening of said passage of said unloader valve means, said body further being provided with spring means normally urging said seat member toward closing engagement with said end face of said unloader valve means and a passage extending from said fluid storage means to said passage of said unloader valve means past said seat member and said end face of said unloader valve means for regulating fluid pressure in said regulated portion of fluid flow from said flow divider means.

5. A hydraulic system as set forth in claim 2 wherein, said bypass valve means is provided with a relief valve means permitting fluid communication between said fluid storage means and said regulated portion of fluid flow upstream of said brake booster and downstream of said flow divider means.

6. A hydraulic system as set forth in claim 1 wherein said system is further provided with orifice means including a housing having a cylindrical bore, an inlet in one end wall of said bore communicating with said fluid flow from said single fluid flow supply source, an outlet in the other end wall of said bore communicating with said fluid storage means and said inlet through said bore, a double acting orifice member slidable in said bore of said housing in dependency upon a reciprocatable stream of fluid between said inlet and said outlet, said double acting orifice member having a central cavity and a pair of orifices both communicating with said central cavity and facing said inlet and said outlet, respectively, one of said orifices adjacent said outlet being diametrically smaller than the other orifice, and a leakage clearance formed between the external face of said double acting orifice member and the internal face of said bore communicating with said central cavity of said double acting orifice member to form a bypass passage between said outlet and said central cavity bypassing said diametrically smaller orifice when fluid stream is toward said inlet from said fluid storage means.

* * * * *